United States Patent
Aggarwal et al.

(10) Patent No.: US 11,126,406 B1
(45) Date of Patent: Sep. 21, 2021

(54) EMBEDDED APPLICATION PROGRAMMING INTERFACE EXPLORER

(71) Applicant: INTUIT INC., Mountain View, CA (US)

(72) Inventors: Vishal Aggarwal, Mountain View, CA (US); Ace Vu, Mountain View, CA (US); Prabhasana Vanka, Mountain View, CA (US); Manas Kumar Mukherjee, Mountain View, CA (US)

(73) Assignee: INTUIT INC., Mountain View, CA (US)

(*) Notice: Subject to any disclaimer, the term of this patent is extended or adjusted under 35 U.S.C. 154(b) by 0 days.

(21) Appl. No.: 15/914,660

(22) Filed: Mar. 7, 2018

(51) Int. Cl.
*G06F 9/44* (2018.01)
*G06F 8/33* (2018.01)
*G06F 9/451* (2018.01)
*G06F 9/54* (2006.01)

(52) U.S. Cl.
CPC ............... *G06F 8/33* (2013.01); *G06F 9/453* (2018.02); *G06F 9/54* (2013.01)

(58) Field of Classification Search
CPC ..... G06F 8/20; G06F 8/34; G06F 8/38; G06F 11/3644; G06F 11/3664; G06F 8/33; G06F 9/453; G06F 9/54
See application file for complete search history.

(56) References Cited

U.S. PATENT DOCUMENTS

| | | | | |
|---|---|---|---|---|
| 2004/0230954 A1* | 11/2004 | Dandoy | ............... | G06F 11/3644 717/124 |
| 2012/0084664 A1* | 4/2012 | Torgerson | ............... | G06F 3/048 715/747 |
| 2012/0291006 A1* | 11/2012 | Quine | ....................... | G06F 8/00 717/105 |
| 2013/0031470 A1* | 1/2013 | Daly, Jr. | ............. | G06F 16/9535 715/243 |
| 2014/0026115 A1* | 1/2014 | Bank | ........................ | G06F 8/38 717/113 |
| 2014/0047368 A1* | 2/2014 | Yang | ........................ | G06F 8/36 715/769 |
| 2014/0047409 A1* | 2/2014 | Yang | ........................ | G06F 8/20 717/105 |
| 2014/0366000 A1* | 12/2014 | Batabyal | ................... | G06F 8/61 717/120 |

(Continued)

OTHER PUBLICATIONS

Asadullah et al, E-Xplore: Enterprise API Explorer, IEEE (Year: 2013).*

(Continued)

*Primary Examiner* — Chat C Do
*Assistant Examiner* — Lenin Paulino
(74) *Attorney, Agent, or Firm* — Patterson + Sheridan LLP

(57) ABSTRACT

Certain aspects of the present disclosure provide techniques for providing a graphical user interface to assist a user of an application programming interface (API). Embodiments include determining that the user has selected an attribute of the API within an API explorer. The API explorer may be displayed with a developer interface of a web application. Embodiments further include identifying a user interface component of the web application that is related to the attribute of the API. Embodiments further include displaying an indication within the developer interface that the user interface component is related to the attribute of the API.

21 Claims, 5 Drawing Sheets

(56) References Cited

U.S. PATENT DOCUMENTS

| | | | |
|---|---|---|---|
| 2014/0366011 A1* | 12/2014 | Rector | G06F 8/71 717/170 |
| 2015/0058833 A1* | 2/2015 | Venkata Naga Ravi | G06F 8/40 717/168 |
| 2017/0220963 A1* | 8/2017 | Canaran | G06F 3/167 |
| 2018/0018186 A1* | 1/2018 | Tammineni | G06F 11/3668 |
| 2018/0107479 A1* | 4/2018 | Duppenthaler | G06F 8/71 |

OTHER PUBLICATIONS

Asadullah et al., E-Xplore: Enterprise API Explorer (Year: 2013).*

* cited by examiner

EMBEDDED APPLICATION PROGRAMMING INTERFACE EXPLORER

INTRODUCTION

Aspects of the present disclosure generally relate to an embedded application programming interface (API) explorer. In particular, embodiments of the present disclosure involve integrating an API explorer into a developer interface of an application.

BACKGROUND

Application programming interfaces (APIs) generally expose various routines and methods to software developers for use in obtaining and modifying data using features of a software application. APIs may be accessible programmatically (e.g., as function calls in an application or function library) or via a web-service (e.g., Web Services Description Language (WSDL)) for web-based applications. For example, developers may use APIs to build web applications or mobile applications that include functionality and user interface components invoked through the API. In some cases, for example, developers may build Software as a Service (SaaS) or plugin applications using an API.

Learning an API can be a challenging task for developers because APIs are often complex and may relate to a domain with which a developer is unfamiliar. For example, an API relating to an accounting application may be challenging to learn for a developer unfamiliar with the accounting domain. Furthermore, APIs are often updated over time. When a new version of an API is released, it may be a lengthy and tedious process for developers to modify existing application code to be compatible with the new version of the API, which may include significant changes to functions and services exposed by the API. As such, there is a need for improved methods and systems for assisting developers in the use of APIs.

BRIEF SUMMARY

Certain embodiments provide a computer-implemented method for providing a graphical user interface to assist a user of an application programming interface (API). The method generally includes determining that the user has selected an attribute of the API within an API explorer, wherein the API explorer is displayed with a developer interface of a web application. The method further includes identifying a user interface component of the web application that is related to the attribute of the API. The method further includes displaying an indication within the developer interface that the user interface component is related to the attribute of the API.

Other embodiments provide a system comprising a processor and a non-transitory computer-readable medium storing instructions that, when executed by the processor, cause the processor to perform an operation for providing a graphical user interface to assist a user of an application programming interface (API). The operation generally includes determining that the user has selected an attribute of the API within an API explorer, wherein the API explorer is displayed with a developer interface of a web application. The operation further includes identifying a user interface component of the web application that is related to the attribute of the API. The operation further includes displaying an indication within the developer interface that the user interface component is related to the attribute of the API.

Other embodiments provide a non-transitory computer-readable medium storing instructions that, when executed by the processor, cause the processor to perform an operation for providing a graphical user interface to assist a user of an application programming interface (API). The operation generally includes determining that the user has selected an attribute of the API within an API explorer, wherein the API explorer is displayed with a developer interface of a web application. The operation further includes identifying a user interface component of the web application that is related to the attribute of the API. The operation further includes displaying an indication within the developer interface that the user interface component is related to the attribute of the API.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
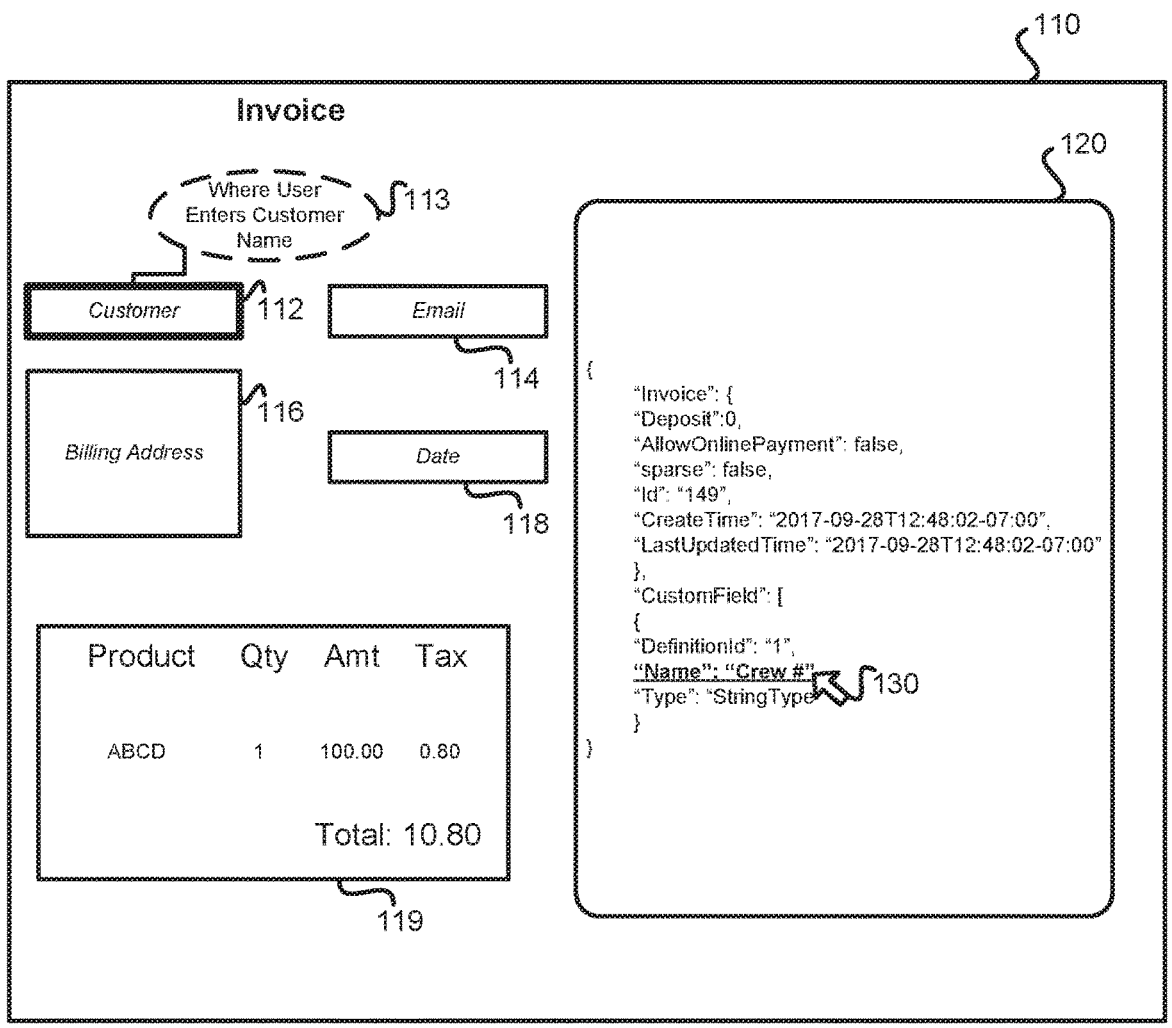
FIGS. 1A and 1B depict examples graphical user interfaces for assisting a user of an API.

Aspects of the present disclosure provide apparatuses, methods, processing systems, and computer readable mediums for assisting users of an API.

The following description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

Application programming interfaces (APIs) generally expose methods (or functions) and procedures that software developers can use to build software applications using features provided by a software system, such as through calls to the API functions. These features may include, for example, database interaction, data processing, and so on. APIs generally define a set of inputs (e.g., attributes) for an application to provide (e.g., as arguments in an API function call) for processing and a set of outputs (e.g., attributes) generated by the application in response to the inputs. An API attribute generally refers to a field that comprises an input or output of an API function. For example, an attribute may comprise a variable, and may be assigned a value based on input provided via an API function call (e.g., defining a value for an input variable) or by programmatic logic of an API function that determines a value of the attribute (e.g., the attribute is returned by the API function as an output variable).

In certain embodiments, an API explorer may be provided with a developer interface of an application in order to assist a user of the API, such a software developer. For example, the application may be hosted on a server, and the user may access the application from a client device over a network. The API explorer may allow the user to view code associated with the developer interface of the application, such as API calls that define components of the developer interface that is currently displayed. For example, the user may launch the API explorer by clicking on a link within the developer interface, and the API explorer may be displayed within the developer interface. In another example, the user may launch the developer interface by clicking on a link within the API explorer, and the developer interface may be displayed adjacent to the API explorer.

In certain embodiments, the user may select an attribute of the API within the API explorer, such as a field within an API call displayed in the API explorer. The user may, for example, mouse-over the attribute (e.g., hover or place a cursor over the attribute), click on the attribute, touch the attribute on a touch screen, or the like. In response to the user's selection, the application server may identify a user interface component that is related to the API attribute, such as a text box that is invoked by a field of an API call selected by the user. An indication may be displayed within the developer interface and/or the API explorer that the user interface component is related to the API attribute that is selected by the user. For example, the user interface component may be highlighted in response to the user's selection of the API attribute. As another example, a message may be displayed adjacent to the user interface component describing the component and/or indicating that it is related to the API attribute. In another example, a graphical connector or other indication may be displayed between the user interface component and the API attribute, such as a line that connects the two. When the user deselects the API attribute, the indication may no longer be displayed. The user may deselect an API attribute by, for example, moving a cursor away from the API attribute, selecting a different API attribute, or the like. In certain embodiments, a selected API attribute may also be modified within the API explorer while it selected. For example, a font, color, size, and/or style of the selected API attribute may be changed to indicate that is selected. When the user deselects the API attribute, the API attribute may return to its normal appearance.

In some embodiments, the user may select a user interface component within the developer interface of the application. In response, the application server may identify an API attribute that is related to the user interface component. For example, if the user hovers over a text box, the application server may identify a variable within an API call that defines the text box. An indication may be displayed within the developer interface and/or the API explorer that the API attribute is related to the user interface component that was selected by the user. The indication may, for example, comprise highlighting the API attribute within the API explorer, changing a font, size, color, or style of the API attribute, displaying a text box adjacent to the API attribute describing the attribute or indicating that it is related to the user interface component, and/or displaying a graphical connector between the user interface component and the API attribute. When the user deselects the user interface component, the indication may no longer be displayed. In certain embodiments, a selected user interface component may also be modified within the developer interface while it selected. For example, a selected user interface component may be highlighted while it is selected. When the user deselects the user interface component, the user interface component may return to its normal appearance. Providing a user with visual indications of relationships between API attributes and user interface components may assist the user in learning the API, and may thereby improve efficiency of API-based software development.

In some embodiments, the API explorer may display API code associated with more than one version of an API. For example, API function calls associated with a first version of the API may be displayed alongside corresponding API function calls associated with a second version of the API. A user may select an attribute, such as a variable of a function call, of one of the versions (e.g., the first version) of the API within the API explorer and an indication may displayed within the API explorer that a corresponding attribute of the other version (e.g., the second version) of the API is related to the selected attribute. Furthermore, an indication may also be displayed within the developer interface and/or the API explorer that a user interface component is related to the attribute. Similarly, if a user selects a user interface component in the developer interface, an indication may be displayed that an attribute of each version of the API is related to the user interface component. Providing a user with visual indications of relationships between different versions of an API may assist the user in migrating code between API versions, and may thereby improve efficiency of such migration tasks.

Relationships between API attributes and user interface components, as well relationships among attributes of different API versions, may be determined using a variety of techniques. In some embodiments, metadata associated with the API attributes and/or user interface components may identify relationships (e.g., metadata associated with a user interface component may identify a mapping between the user interface component and an API attribute). In one embodiment, metadata that identifies relationships may be included within the API attributes and/or user interface components by developers of the API.

In other embodiments, relationships may be determined by string matching. For example, if strings associated with an API attribute and a user interface component (e.g., strings that specify names) are sufficiently similar (e.g., above a certain threshold of similarity), the API attribute and the user interface component may be considered to be related and a mapping between the two may be identified. In certain embodiments, an edit distance or Levenshtein distance may be used to determine the similarity of strings. Edit distance or Levenshtein distance is a measure of the similarity between two strings, which is based on the number of deletions, insertions, or substitutions required to transform one of the strings into the other. In other embodiments, relationship information may be maintained as mappings in a data store by an application server, and the data store may be consulted in order to identify relationships based on mappings between API attributes and user interface components.

In certain embodiments, the user may be able to modify items, such as API attributes within the API explorer and user interface components within the developer interface of the application. When an item is modified, related items may be updated as applicable based on the modification. For example, a user, such as a developer, may change a value of a variable of an API function call within the API explorer, and in response the application server may change a user interface component that is related to the variable to reflect the new value within the developer interface. Likewise, a user, such as a developer, may modify a user interface component within the developer interface, and in response, related API function calls may be updated within the API explorer to reflect the change. For example, if a box within the developer interface is resized, an API function call related to the box may be changed within the API explorer to reflect the updated properties of the box.

Embodiments of the present disclosure constitute a technological improvement because they allow for developers to easily identify, through a convenient developer graphical user interface, how API code relates to user interface components of an application and how different API versions relate to one another. Providing an API explorer with a developer interface of an application related to the API according to techniques described herein allows for a user, such as a developer, to easily learn a new API or a new version of an existing API by visualizing the relationships among API attributes and user interface components. For example, rather than reading potentially large amounts of API documentation, a developer may be able to learn an API dynamically by seeing how certain API attributes are related to particular user interface components.

Further, techniques described herein comprise a specific manner of displaying a limited set of information relating to an API to a user, rather than using conventional user interface methods to display API code and user interface components of an application independently. This dynamic interaction between an application and an API explorer constitutes an improvement with respect to conventional industry practice. Furthermore, providing developers with a way to visually navigate through relationships among different versions of an API may reduce the time and effort required to migrate code from one version of an API to another.

Example Developer Interface

FIG. 1A depicts an example of a graphical user interface provided to assist a user of an API. As depicted, a developer interface 110 of an application is displayed along with an API explorer 120, which (in this example) is embedded within the developer interface 110. Developer interface 110, including API explorer 120, may comprise content provided by an application server over a network, and may be accessed by a user, such as a developer, via a client device.

Developer interface 110 may include an interface made up of a plurality of user interface components 112, 114, 116, 118, and 119, which comprise elements of an invoice (e.g., related to a financial services application), and which are invoked by attributes of API function calls shown in API explorer 120.

In certain embodiments developer interface 110 comprises a "sandbox" that is launched by the user and that displays user interface components as they are defined by API code shown in API explorer 120. The sandbox allows the user to experiment with API code by visualizing the user interface components that are related to attributes of the API code during development. For example, while viewing or developing code within the API explorer, the user may click on a link associated with the API explorer to launch the sandbox environment.

In other embodiments, API explorer 120 comprises an "API explorer view" that is launched by the user and that depicts the API code underlying an existing application viewed by the user via the developer interface. For example, while viewing the developer interface of a web application, the user may click on a link associated with the developer interface to launch the API explorer.

As depicted in FIG. 1A, the user has selected the API attribute "Name": "Crew #" within API explorer 120 by hovering over the API attribute with a cursor. In response, a related user interface component 112, including the text "Customer", is highlighted within developer interface 110. The selected API attribute may, for example, be an API attribute that describes the user interface component 112. Furthermore, a message 113 is shown adjacent to the text box, reading "Where User Enters Customer Name," and is connected to the user interface component 112 by a line. As shown, the message 113 describes the user interface component 112, which is a field within the invoice where a user enters a customer name.

Figure 1B:
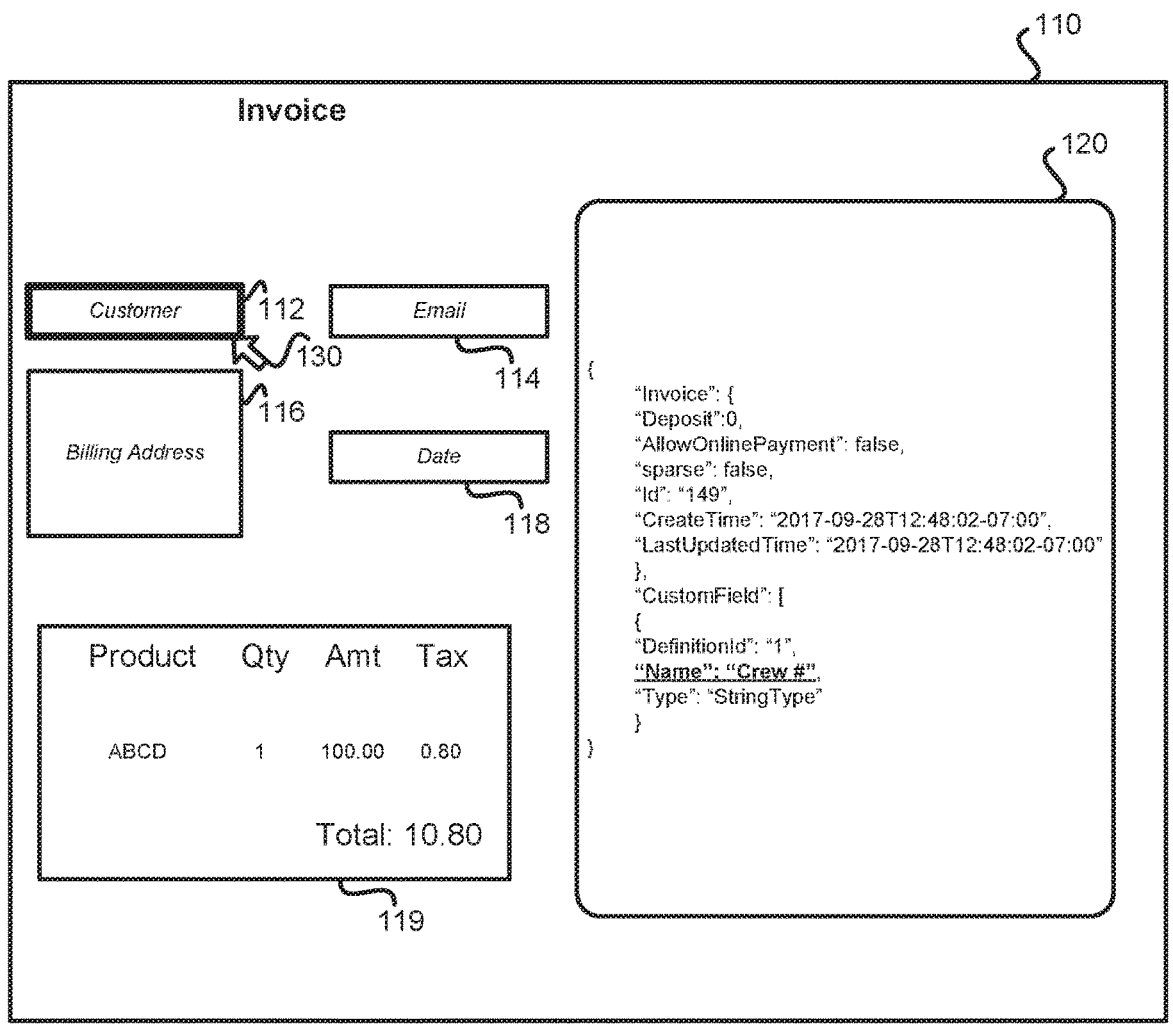

FIG. 1B depicts another example of a graphical user interface provided to assist a user of an API. As depicted, the user has selected the user interface component 112 including the text "Customer" by hovering over the user interface component 112 within developer interface 110 with a cursor. Accordingly, a related API attribute "Name": "Crew #", is highlighted within API explorer 120. The highlighted API attribute may, for example, be an API attribute that describes the selected user interface component 112.

It is noted that the examples depicted in FIGS. 1A and 1B, and described herein, are merely two examples of techniques that may be implemented according to embodiments of the present disclosure. Other embodiments and appearances may be implemented consistent with the present disclosure.

Example Computer-Implemented Method

Figure 2:
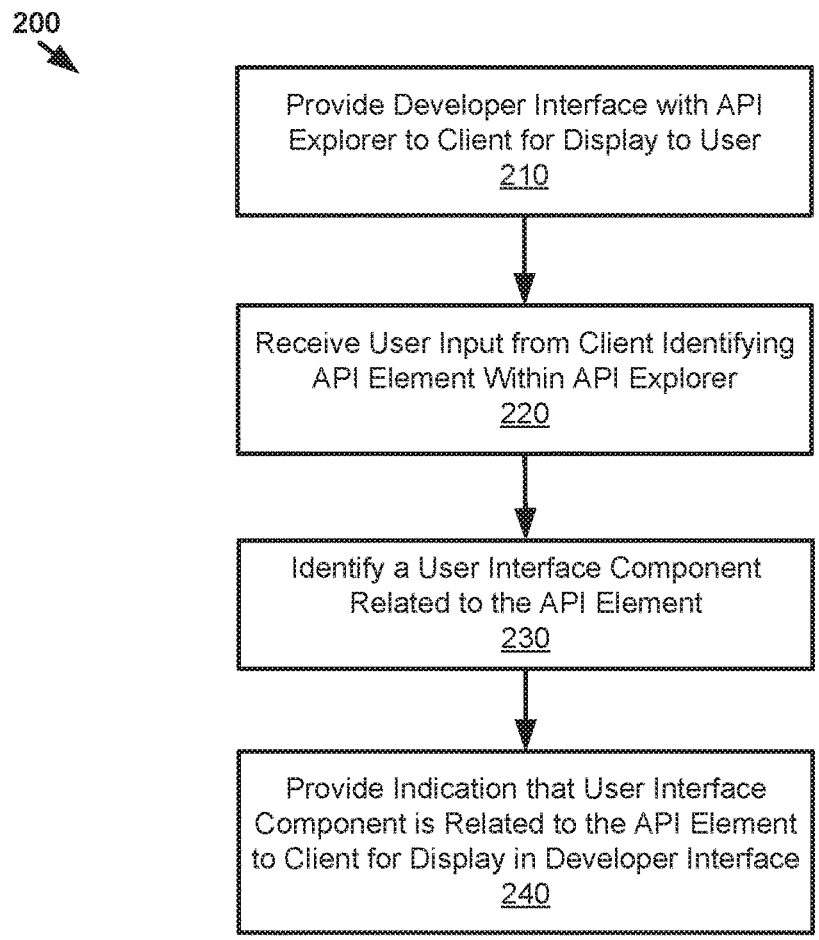
FIG. 2 depicts example operations for assisting a user of an API.

FIG. 2 depicts example operations 200 for assisting a user of an API. Operations 200 may, for example, be performed by an API explorer engine (as described further below with respect to FIG. 3).

Operations 200 begin at step 210, where a developer interface is provided with an API explorer for display on a client device.

At step 220, user input is received that identifies an API attribute within an API explorer. For example, a user may mouse-over a variable of an API function call within an API explorer that is displayed along with a developer interface of an application on a client device.

At step 230, a user interface component related to the API attribute is identified. For example, a relationship between a user interface component and the variable of the API function call that was selected by the user may be determined based on metadata associated with the user interface component and/or the variable. The user interface component may, for example, be related to the variable because it is described by or invoked by the variable. A variable defining a text box, for example, is related to the text box that it defines. Developers may associate metadata with API attributes and/or user interface components indicating interrelationships among them.

At step 240, an indication is displayed within the developer interface on the client device that the user interface component is related to the selected API attribute. For example, the user interface component may be highlighted in a particular color within the developer interface. In some embodiments, a message may be displayed adjacent to the user interface component describing the user interface component and/or describing the relationship between the user interface component and the API attribute. The user may view the indication of this relationship within the developer interface, and this may assist the user in learning the API. For example, the ability to visually identify a user interface component that is invoked by a particular API attribute may assist the user in the development of a client-side application using the API.

Example Computing Environment

Figure 3:
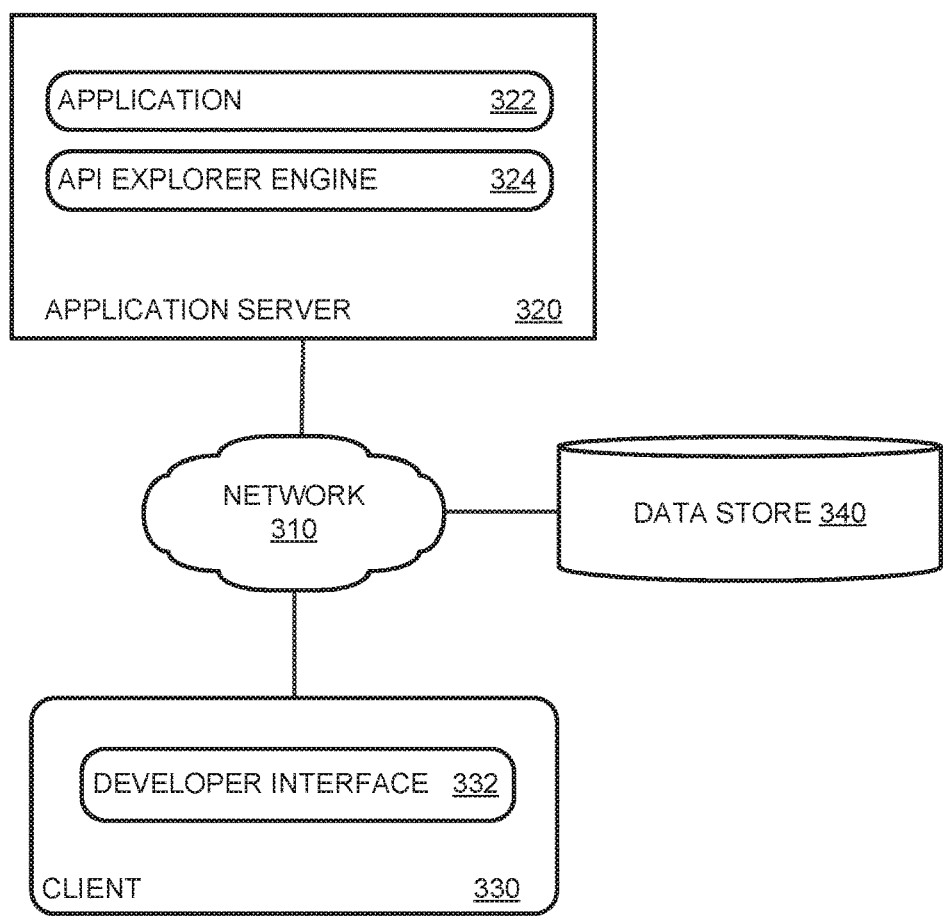
FIG. 3 depicts an example computing environment in which embodiments of the present disclosure may be implemented.

FIG. 3 depicts an example computing environment 300 in which embodiments of the present disclosure may be implemented.

Computing environment 300 comprises an application server 320, a client 330, and a data store 340, all of which are connected by a network 310 (e.g., the Internet). Application server may comprise a physical or virtual computing device, such as a server, desktop computer, laptop computer, portable electronic device, smart device, internet of things (IoT) device, or the like. Application server 320 comprises an application 322 and an API explorer engine 324. Application 322 may, for example, comprise a server-side component of a client-server application, such as web application, which is hosted on application server 320 and accessed remotely by developer interface 332 of client 330. In some embodiments, application 322 may comprise a Software as a Service (Saas) or plugin application. In certain embodiments, application 322 is associated with an API used to invoke functionality of application 322 (e.g., through API function calls).

API explorer engine 324 may perform operations related to providing a graphical user interface to assist a user of an API, according to embodiments of the present disclosure. For example, API explorer engine 324 may implement an API explorer to be displayed along with application 322 (e.g., accessed by the user through developer interface 332 of client 330). In certain embodiments the API explorer may be embedded within application 322. In other embodiments, the API explorer may be displayed alongside application 322. API explorer engine 324 may receive input from users, such as a user of client 330, selecting API attributes, such as variables of API function calls, and/or user interface components, such as text and graphics. In response to receiving input comprising a selection of an item, API explorer engine 324 may identify one or more relationships between the selected item and other items, such as user interface components and/or API attributes, and display an indication of the one or more relationships within application 322 and/or the API explorer.

For example, a user of client 330 may select a variable of an API function call within the API explorer (e.g., displayed within developer interface 332). API explorer engine 324 may identify a user interface component that is related to the variable based, for example, on metadata associated with the variable. API explorer engine 324 may then display an indication within application 322 (e.g., which may be displayed within developer interface 332) that the user interface component is related to the variable. The indication may, for example, comprise highlighting the user interface component and displaying a text box adjacent to the user interface component that describes the user interface component.

In some embodiments, API explorer engine 324 may also identify relationships between attributes from different API versions, and display indications of these relationships when an attribute is selected within the API explorer. For example, attributes may comprise metadata that indicates relationships between the attributes and attributes of other API versions, and API explorer engine 324 may use this metadata to identify these relationships.

Client 330 may comprise a physical or virtual computing device, such as a desktop or laptop computer, a mobile phone, a tablet, or the like. Client 330 comprises a developer interface 332, which may comprise a client-side component of a client-server application, through which a user accesses application 322 over network 310. In certain embodiments, developer interface 332 is a browser, and application 322 is a web application that a user accesses through the browser over the Internet.

In some embodiments an API explorer is provided by API explorer engine 324 along with application 322 within developer interface 332. For example, the API explorer may be embedded within application 322 or provided adjacent to application 322 within developer interface 332. The user may interact with application 322, as well as the API explorer, through developer interface 332. For example, the user may select items displayed within developer interface 332 in order to view indications of items that are related to selected items. The user may also be able to modify items within developer interface 332 (e.g., the developer interface of application 322 and the API explorer), such as by editing text, clicking, dragging, touching, hovering over, or otherwise interacting with the items. In certain embodiments, modifications to an item by a user may result in modifications to related items displayed within developer interface 332.

Data store 340 may comprise a data storage entity, such as a repository or database, for storing files related to the API. For example, data store 340 may comprise schema files that define one or more functions provided by the API. In certain embodiments, data store 340 may also store relationship information that indicates relationships among API attributes and user interface components. For example, data store 340 may store mappings among API attributes and user interface components. In one embodiment, API explorer engine 324 may access mapping information stored in data store 340 over network 310 in order to determine relationships between items such as API attributes and user interface components or between API attributes of different API versions. In some embodiments, data store 340 may be a part of application server 320.

While certain functions are described with respect to particular components depicted in FIG. 3, it is noted that other arrangements are possible. Furthermore, certain components may alternatively be implemented as a plurality of local or remote components. For example, the functionality of application server 320 may be distributed across a plurality of computing devices.

Figure 4:
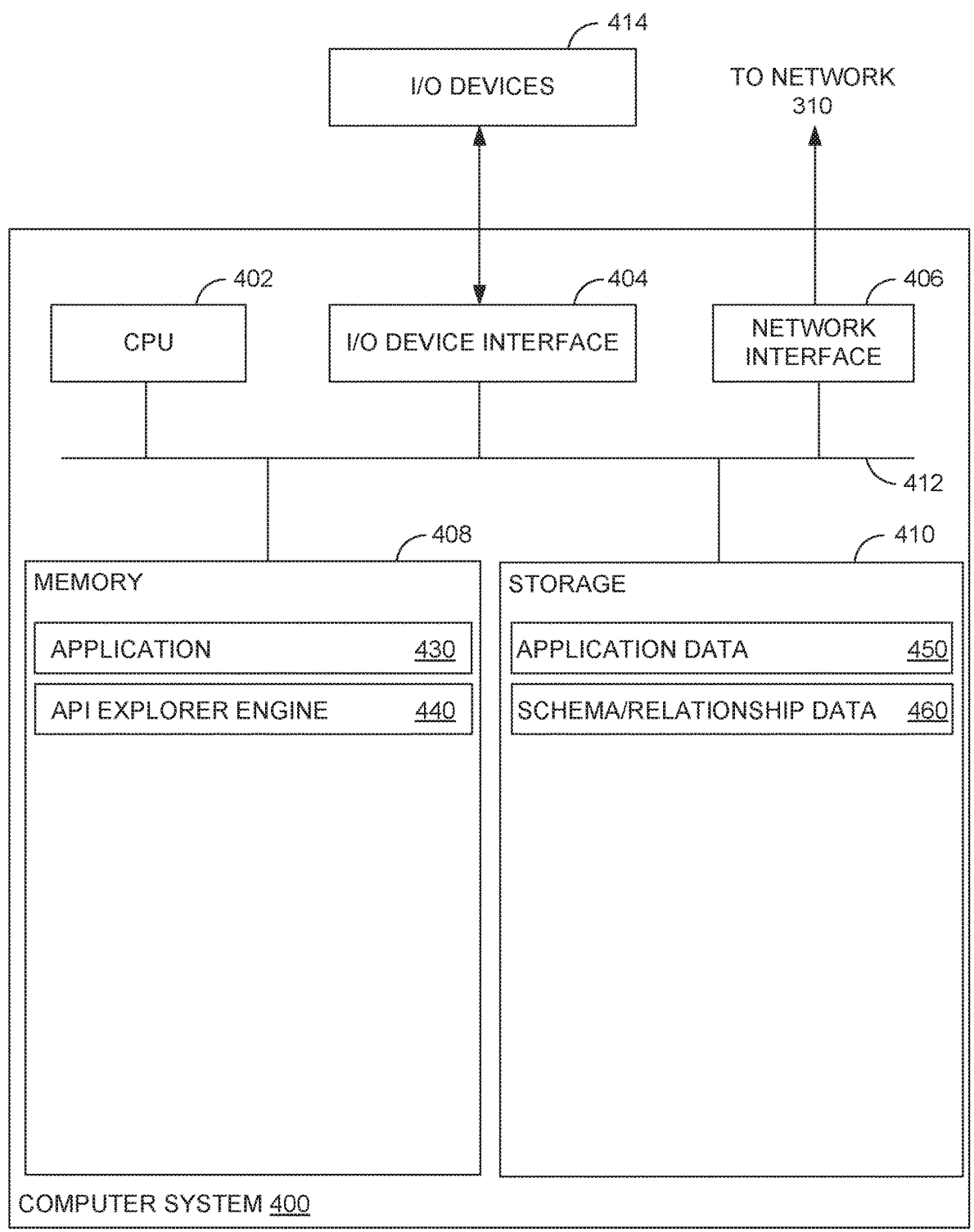
FIG. 4 depicts an example computing system with which embodiments of the present disclosure may be implemented.

FIG. 4 illustrates an example computer system 400 used for providing a graphical user interface to assist a user of an API, according to embodiments of the present disclosure. For example, computer system 400 may be representative of application server 320 in FIG. 3.

As shown, the system 400 includes a central processing unit (CPU) 402, one or more I/O device interfaces 404 that may allow for the connection of various I/O devices 414 (e.g., keyboards, displays, mouse devices, pen input, etc.) to the system 400, network interface 406, a memory 408, storage 410, and an interconnect 412.

CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 406, memory 408, and storage 410. CPU 402 is included to be representative of a single CPU, multiple CPUs, a single CPU having multiple processing cores, and the like. Additionally, the memory 408 is included to be representative of a random access memory. Furthermore, the storage 410 may be a disk drive, solid state drive, or a collection of storage devices distributed across multiple storage systems. Although shown as a single unit, the storage 410 may be a combination of fixed and/or removable storage devices, such as fixed disc drives, removable memory cards or optical storage, network attached storage (NAS), or a storage area-network (SAN).

Storage 410 comprises application data 450, which may comprise data related to application 430, such as user files and executable application files. Storage 410 further comprises schema/relationship data 460, which may include schema files that define one or more functions provided by an API and relationship information that indicates relationships among API attributes and user interface components. For example, data store 460 may store mappings among API attributes and user interface components.

As shown, memory 408 includes an application 430 and an API explorer engine 440, which may perform operations related to assisting a user of an API (e.g., functionality described above with respect to FIGS. 1-3). For example, API explorer engine 440 may receive user input selecting an item, may identify one or more related items, and may display one or more indications that the one or more items are related to the selected item within a developer interface of application 430. The API explorer engine 440 in memory 408 may communicate with other devices (e.g., clients and remote data stores) over a network 310 through network interface 406 (e.g., in order to receive input, determine relationships, and provide indications to be displayed).

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A developer interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for providing a graphical user interface to assist a user of an application programming interface (API), comprising:
    determining that the user has selected an attribute of the API within code displayed in an API explorer, wherein:
        the API explorer is displayed with a developer interface of a web application;
        the attribute of the API is part of a function call displayed within the API explorer; and
        determining that the user has selected the attribute of the API comprises detecting one of the following from the user:
            a click on the attribute of the API within the code;
            a touch of the attribute of the API within the code; or
            a mouse-over of the attribute of the API within the code;
    modifying an appearance of the attribute of the API within the code displayed in the API explorer from a first appearance state to a second appearance state to indicate that the attribute of the API is selected;
    identifying, a user interface component of the web application that is related to the attribute of the API based on a mapping between the user interface component and the attribute of the API determined from a similarity of string associated with the user interface component and the attribute of the API, wherein the similarity of the strings is above a threshold;
    displaying a first visual indication within the developer interface that the user interface component is related to the attribute of the API by displaying a description message adjacent to the user interface component;
    determining that the attribute of the API is associated with a first version of the API;
    identifying a corresponding attribute of a second version of the API that is related to the attribute of the API;
    displaying a second visual indication within the developer interface that the corresponding attribute of the second version of the API is related to the attribute of the API;
    receiving input from the user modifying the user interface component within the developer interface;
    modifying the function call displayed within the API explorer based on the input from the user modifying the user interface component within the developer interface;
    receiving input from the user modifying the attribute within the API explorer; and
    modifying the user interface component within the developer interface based on the input from the user modifying the attribute of the API explorer.

2. The computer-implemented method of claim 1, wherein modifying the appearance of the attribute of the API within the code displayed in the API explorer comprises modifying one or more of:
    a font;
    a color;
    a size; or
    a style of the attribute of the API within the code to indicate that the attribute of the API is selected.

3. The computer-implemented method of claim 1, wherein displaying the first visual indication within the web application that the user interface component is related to the attribute of the API comprises highlighting the user interface component in the web application.

4. The computer-implemented method of claim 1, wherein displaying the first visual indication within the web application that the user interface component is related to the attribute of the API further comprises displaying a graphical connector between the user interface component in the web application and the attribute of the API in the API explorer.

5. The computer-implemented method of claim 1, wherein identifying the user interface component of the web application that is related to the attribute of the API comprises: using metadata associated with the user interface component to identify a relationship between the user interface component and the attribute of the API.

6. The computer-implemented method of claim 1, further comprising:
  determining that the user has selected a second user interface component within the web application;
  identifying a second attribute of the API that is related to the second user interface component; and
  displaying a third visual indication within the web application that the second attribute of the API is related to the second user interface component.

7. The computer-implemented method of claim 1, wherein determining that the user has selected the attribute of the API comprises: receiving input from the user that identifies a variable of the function call.

8. A system comprising:
  a processor; and
  a non-transitory computer-readable medium storing instructions that, when executed by the processor, cause the processor to perform an operation for providing a graphical user interface to assist a user of an application programming interface (API), the operation comprising:
    determining that the user has selected an attribute of the API within code displayed in an API explorer, wherein:
      the API explorer is displayed with a developer interface of a web application;
      the attribute of the API is part of a function call displayed within the API explorer; and
      determining that the user has selected the attribute of the API comprises detecting one of the following from the user:
        a click on the attribute of the API within the code;
        a touch of the attribute of the API within the code; or
        a mouse-over of the attribute of the API within the code;
    modifying an appearance of the attribute of the API within the code displayed in the API explorer from a first appearance state to a second appearance state to indicate that the attribute of the API is selected;
    identifying, a user interface component of the web application that is related to the attribute of the API based on a mapping between the user interface component and the attribute of the API determined from a similarity of string associated with the user interface component and the attribute of the API, wherein the similarity of the strings is above a threshold;
    displaying a first visual indication within the developer interface that the user interface component is related to the attribute of the API by displaying a description message adjacent to the user interface component;
    determining that the attribute of the API is associated with a first version of the API;
    identifying a corresponding attribute of a second version of the API that is related to the attribute of the API;
    displaying a second visual indication within the developer interface that the corresponding attribute of the second version of the API is related to the attribute of the API;
    receiving input from the user modifying the user interface component within the developer interface;
    modifying the function call displayed within the API explorer based on the input from the user modifying the user interface component within the developer interface;
    receiving input from the user modifying the attribute within the API explorer; and
    modifying the user interface component within the developer interface based on the input from the user modifying the attribute of the API explorer.

9. The system of claim 8, wherein modifying the appearance of the attribute of the API within the code displayed in the API explorer comprises modifying one or more of:
  a font;
  a color;
  a size; or
  a style of the attribute of the API within the code to indicate that the attribute of the API is selected.

10. The system of claim 8, wherein displaying the first visual indication within the web application that the user interface component is related to the attribute of the API comprises highlighting the user interface component in the web application.

11. The system of claim 8, wherein displaying the first visual indication within the web application that the user interface component is related to the attribute of the API further comprises displaying a graphical connector between the user interface component in the web application and the attribute of the API in the API explorer.

12. The system of claim 8, wherein identifying the user interface component of the web application that is related to the attribute of the API comprises: using metadata associated with the user interface component to identify a relationship between the user interface component and the attribute of the API.

13. The system of claim 8, wherein the operation further comprises:
  determining that the user has selected a second user interface component within the web application;
  identifying a second attribute of the API that is related to the second user interface component; and
  displaying a third visual indication within the web application that the second attribute of the API is related to the second user interface component.

14. The system of claim 8, wherein determining that the user has selected the attribute of the API comprises: receiving input from the user that identifies a variable of the function call.

15. A non-transitory computer-readable medium storing instructions that, when executed by a processor, cause the processor to perform an operation for providing a graphical user interface to assist a user of an application programming interface (API), the operation comprising:
  determining that the user has selected an attribute of the API within code displayed in an API explorer, wherein:
    the API explorer is displayed with a developer interface of a web application;
    the attribute of the API is part of a function call displayed within the API explorer; and determining that the user has selected the attribute of the API comprises detecting one of the following from the user:
  a click on the attribute of the API within the code;
  a touch of the attribute of the API within the code; or
  a mouse-over of the attribute of the API within the code;
modifying an appearance of the attribute of the API within the code displayed in the API explorer from a first appearance state to a second appearance state to indicate that the attribute of the API is selected;
identifying, a user interface component of the web application that is related to the attribute of the API based on a mapping between the user interface component and the attribute of the API determined from a similarity of string associated with the user interface component and the attribute of the API, wherein the similarity of the strings is above a threshold;
displaying a first visual indication within the developer interface that the user interface component is related to the attribute of the API by displaying a description message adjacent to the user interface component;
determining that the attribute of the API is associated with a first version of the API;
identifying a corresponding attribute of a second version of the API that is related to the attribute of the API;
displaying a second visual indication within the developer interface that the corresponding attribute of the second version of the API is related to the attribute of the API;
receiving input from the user modifying the user interface component within the developer interface;
modifying the function call displayed within the API explorer based on the input from the user modifying the user interface component within the developer interface;
receiving input from the user modifying the attribute within the API explorer; and
modifying the user interface component within the developer interface based on the input from the user modifying the attribute of the API explorer.

16. The non-transitory computer-readable medium of claim 15, wherein modifying the appearance of the attribute of the API within the code displayed in the API explorer comprises modifying one or more of:
  a font;
  a color;
  a size; or
  a style of the attribute of the API within the code to indicate that the attribute of the API is selected.

17. The non-transitory computer-readable medium of claim 15, wherein displaying the first visual indication within the web application that the user interface component is related to the attribute of the API comprises highlighting the user interface component in the web application.

18. The non-transitory computer-readable medium of claim 15, wherein displaying the first visual indication within the web application that the user interface component is related to the attribute of the API further comprises displaying a graphical connector between the user interface component in the web application and the attribute of the API in the API explorer.

19. The non-transitory computer-readable medium of claim 15, wherein identifying the user interface component of the web application that is related to the attribute of the API comprises: using metadata associated with the user interface component to identify a relationship between the user interface component and the attribute of the API.

20. The non-transitory computer-readable medium of claim 15, wherein the operation further comprises:
  determining that the user has selected a second user interface component within the web application;
  identifying a second attribute of the API that is related to the second user interface component; and
  displaying a third visual indication within the web application that the second attribute of the API is related to the second user interface component.

21. The non-transitory computer-readable medium of claim 15, wherein determining that the user has selected the attribute of the API comprises: receiving input from the user that identifies a variable of the function call.

* * * * *